United States Patent [19]

Black

[11] 4,416,572
[45] Nov. 22, 1983

[54] COLLAPSIBLE FASTENER WITH PLASTIC SLEEVE

[75] Inventor: Daniel A. Black, Pleasant Hills, Pa.

[73] Assignee: Textron Inc., Providence, R.I.

[21] Appl. No.: 264,436

[22] Filed: May 18, 1981

[51] Int. Cl.³ .............................................. F16B 13/04
[52] U.S. Cl. ..................................... 411/38; 411/542; 411/908
[58] Field of Search .............. 411/1, 8, 11, 29, 34–38, 411/70, 542, 907, 908, 15

[56] References Cited

U.S. PATENT DOCUMENTS

| 3,316,796 | 5/1967 | Young | 411/29 |
|---|---|---|---|
| 4,274,324 | 6/1981 | Giannuzzi | 411/908 |
| 4,280,390 | 7/1981 | Murray | 411/542 |

FOREIGN PATENT DOCUMENTS 1278641 11/1961 France ................................. 411/38

Primary Examiner—Gary L. Smith
Assistant Examiner—Neill Wilson
Attorney, Agent, or Firm—Webb, Burden, Robinson & Webb

[57] ABSTRACT

A collapsible fastener comprises a tubular plastic having a head on one end for bearing against one surface of the work. There is an internally threaded tail portion at the shank end of the sleeve. The shank is slotted to define strips which are notched internally and intermediate the ends. The slots increase in width from their ends to the area of the notches. A screw extends through the sleeve and is devoid of threads intermediate its ends to prevent overtorquing. A radially tapered annulus is positioned atop the sleeve for sealable engagement with the screw head in the assembled condition.

4 Claims, 6 Drawing Figures

COLLAPSIBLE FASTENER WITH PLASTIC SLEEVE

BACKGROUND OF THE INVENTION

1. Field of the Invention

This invention relates to fasteners, especially fasteners suitable for use in mounting panels or sheets of metal, plastics or composition materials to supporting structures and/or to each other. Such fasteners are commonly used in the construction of metal buildings and the like. Fasteners according to the present invention have special utility and advantages in attaching plastic sheet or corrugated panels, for example, such as is used for connecting a skylight to a supporting structure. Such fasteners can be mounted where access to only one side of a panel is possible, so-called "blind fasteners".

2. Brief Description of the Prior Art

Heretofore, various fasteners have been developed for use in mounting panels of sheet metal, plastics or composition materials to supporting structures and/or to each other. One such fastener which has gained acceptance commercially for plastic sheet and the like is sold by the assignee of this application under the trademark "Lap-Lox". The Lap-Lox fastener comprises an aluminum or stainless bolt positioned within a composite metal-neoprene bonded washer and extending through a grommet having an internally bonded threaded brass insert. As the bolt is turned in the insert, the grommet is compressed and it collapses against the side laps. This fastener has limited clamp-up capability and resistance to tensile forces.

Another fastener sold under the trademark "Fab-Lok" is made entirely of metal material and is primarily intended for fastening metal sheets together or to heavy or light gauge framing. As shown in U.S. Pat. No. 3,667,346, it comprises a tubular sleeve which has a head on one end for bearing against one side of the work or panel to be mounted and an internally threaded tail portion on the opposite end. A metal screw which is threaded throughout its entire length is extended through the head and sleeve into the tail and is positioned so that the screw head is normally initially spaced from the head of the sleeve. The shank of the sleeve is slotted and the resulting strips are notched internally at about the midpoint between the ends of the shank so that by turning the screw the tail portion travels toward the head and the strips are folded against the other side of the work or panel to be mounted. Since the fastener has both a metal sleeve and a metal screw, in practice it has been necessary to provide a neoprene rubber or similar material washer between the head of the sleeve and the work to effect a seal therebetween to prevent leakage at the point of mounting.

In addition, since the screw is threaded throughout its entire length in the Fab-Lok fastener, as the tail portion travels toward the head portion when the screw is turned, there is a danger of overtorquing, thus stripping the external threads on the screw or the internal threads in the tail portion, loosening or destroying the otherwise secure connection between the work and the fastener.

Thus, it would be desirable to provide an improved fastener for mounting panels or sheets of metal, plastics or composition materials to supporting structures and/or to each other under circumstances where both sides or only one side of the work is accessible to the installer.

It would also be desirable for such fasteners to be lightweight, inexpensive and to have improved corrosion resistance, and to incorporate means to prevent overtorquing of the fastener so that a tight, moisture-free connection would be virtually guaranteed upon proper installation. The fastener must also have a clamp-up capability and ample resistance to tensile forces.

Prior fasteners have included means for preventing or reducing corrosion and for preventing overtorquing. For example, U.S. Pat. No. 3,343,442 discloses a fastener which includes a resilient sleeve of an elastomeric material, for example polyurethane rubber, which is molded over the head of a metal bolt. As a nut is tightened onto the bolt threads the sleeve is compressed tightly, which is said to effectively seal the aperture in a panel on which it is mounted. The shank of the bolt of the disclosed fastener has a narrow unthreaded neck portion intermediate the ends of the bolt. According to the patent, the nut can only be torqued onto the bolt until it reaches the narrow neck portion, at which point application of additional torque will only cause the nut to spin freely. It will be appreciated, however, that such a fastener requires a separate molding operation to effect a bond between the sleeve and the bolt head. It also requires available access to both sides of the work so that the nut can be tightened. Moreover, the expandable sleeve extends from the outside surface of the work when the fastener is installed, whereas it is desirable, as in the "Fab-Lok" fastener, that the expandable portion of the fastener be hidden from view behind the panel, especially in installations where the outside surface is "finished" and the panel is attached to supporting structures.

Means for preventing overtorquing of a screw and tubular sleeve fastener in the form of an expansion anchor bolt is disclosed in U.S. Pat. No. 3,316,796. The fastener disclosed in that patent includes a bolt having a shank with a diametrically reduced portion intermediate the ends of the shank. The bolt is installed in the sleeve and tightened to pull the end of the sleeve toward the head of the bolt. When the reduced portion of the bolt is reached, according to the patent the bolt will rotate within the thread aperture at the end of the sleeve but the end will not move any further toward the opposite or head end of the sleeve.

The present invention has distinct advantages over each of the foregoing known fasteners, as will become apparent from a perusal of the present specification.

SUMMARY OF THE INVENTION

The present invention is an improved connecting device in the nature of a collapsible fastener. The fastening device comprises a tubular sleeve having a head on one end for bearing against one surface of the work. There is an internally threaded or otherwise disrupted tail portion on the sleeve and a shank extending between the sleeve ends. The shank of the sleeve is slotted and the resulting strips are notched internally intermediate the ends. The slots are double tapered, increasing in width from both ends toward the area of the notches. A screw is extended through the head and the screw end is threaded into the tail portion such that by turning the screw the tail travels toward the head and the strips are folded against the other surface of the work. A compressible annulus is formed on the opposite side of the head of the sleeve from the shank and surrounds the bore of the sleeve. The annulus is radially tapered through its periphery toward the longitudinal central axis of the tubular sleeve. The screw shank between the top of the screw threads and the screw head has a diameter approximately equal to or less than the root diameter of the screw threads and is devoid of threads. The length of the sleeve between the end opposite the sleeve head and the internal notches is less than the length of the screw shank carrying threads. Accordingly, when the fastener is set the annulus is tightly engaged by the screw against a surface of the work to provide a seal therebetween, and the absence of screw threads on the shank prevents overtorquing of the fastener.

The sleeve is formed of a plastic material of a strong, yet pliable, plastic material such as polycarbonate or its equivalent. Thus, when the screw is tightened in the sleeve, the annulus is tightly engaged by the screw against a surface of the work to prevent moisture from entering the space between the head of the sleeve and the shank and contacting the work where corrosion could take place.

The absence of screw threads on the shank between the existing screw threads and the head portion of the screw shank prevents overtorquing, thus reducing or eliminating the possibility of breaking, cracking or otherwise destroying the plastic sleeve as it is folded against the surface of the work upon application of torque to the screw. The resultant fastener has good clamp-up capability and adequate resistance to tensile forces.

DETAILED DESCRIPTION OF PREFERRED EMBODIMENTS OF THE INVENTION

Figure 1:
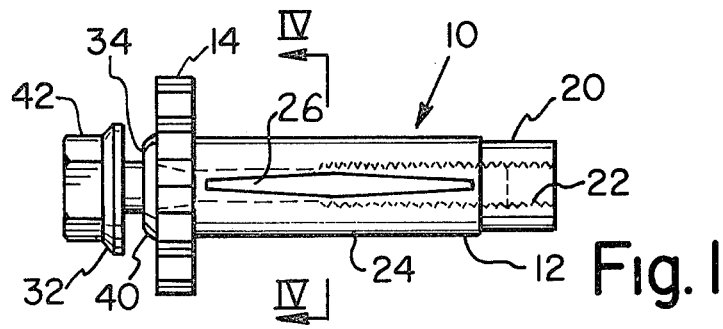
FIG. 1 is an elevation view of an assembled fastener in accordance with the present invention.
Figure 2:
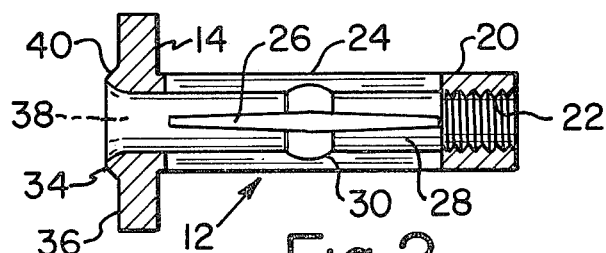
FIG. 2 is a sectional view taken along a longitudinal plane through the central axis of the sleeve of the fastener of FIG. 1.
Figure 4:
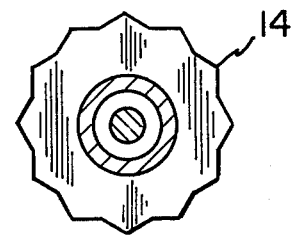
FIG. 4 is a sectional view taken along lines IV—IV of FIG. 1.
Figure 3:
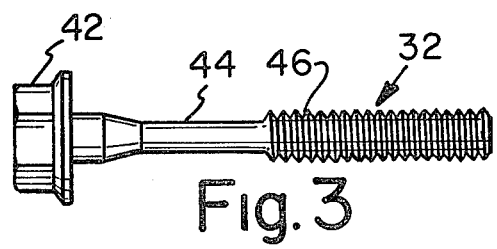
FIG. 3 is an elevation view of a screw for use in the fastener of FIG. 1.

Referring to FIGS. 1 through 6 of the drawings, the fastening device 10 in accordance with the invention comprises a tubular sleeve 12 having a head 14 on one end for bearing against one surface of the work 16 which is to be joined to work 18. The sleeve has a tail portion 20 which includes internal threads 22. The internal threads can be of a variety of designs to accommodate various known fasteners. A shank 24 extends between the sleeve ends. The shank of the sleeve includes longitudinal slots 26 which define strips 28 along the shank. The strips have internal notches 30 intermediate the ends of the strips.

The slots 26 increase in width from their respective ends toward the middle so as to have the greatest width in the area of the internal notches 30. This assures proper collapsing of the sleeve 12 as will be described hereinafter.

A screw 32 is provided through the head 14 of the sleeve, and the screw end is threaded into the tail portion 20 such that by turning the screw, the tail travels toward the head and the strips 28 are folded in the area of the greatest slot widths and notches 30 and against the surface of the workpiece.

An annulus 34 is formed on the opposite side 36 of the head 14 of the sleeve 12 from the shank 24, and surrounds the bore 38 of the sleeve. The annulus 34 includes a taper 40 throughout its periphery toward the longitudinal central axis of the tubular sleeve 12.

When the fastening device is assembled, the screw head 42 is initially spaced from the head 14 of the sleeve. The screw shank 44, between the top of the screw threads 46 and the screw head 42, has a diameter approximately equal to or less than the root diameter of the screw threads 46. This portion of the shank is devoid of threads.

The length of the sleeve 12, between the end opposite the sleeve head 14 and the internal notches 30, is less than the length of the screw shank carrying threads 46. Accordingly, the annulus 34 is tightly engaged by the screw to provide a seal between the work 18 and the annulus 34, and the abscence of screw threads on the screw shank 44 prevents overtorquing of the fastening device when it is set.

The sleeve 12 is preferably made of a strong, yet flexible, plastic material such as polycarbonate or its equivalent. Thus, when the screw 32 is tightened in the sleeve 12, the annulus 34 is tightly engaged with the surface of work 18, and the screw head 42 approaches the surface of the work 16 to prevent moisture from entering the aperture through the work. In addition, the collapsed end of the fastener molds itself to the contour on the work. This is particularly useful where the work is corrugated or nonplanar.

The absence of screw threads on the screw shank 44 prevents overtorquing, thus reduced or eliminating the possibility of breaking, cracking or otherwise destroying the plastic sleeve as it is folded against the surface of the work upon application of torque to the screw.

Figure 5:
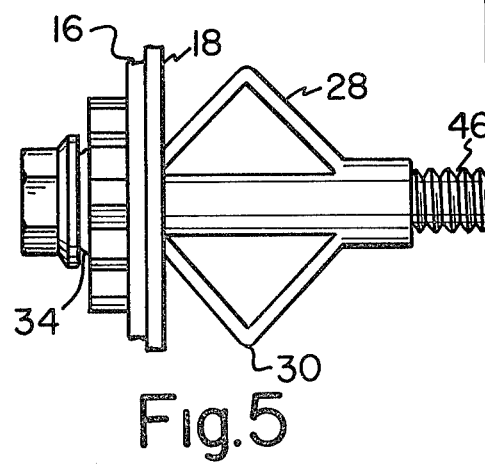
FIG. 5 is an elevation view of the fastener of FIG. 1 in a partially set condition joining portions of two panels to one another.

As shown in FIG. 5, wherein the fastening device is in a partially set condition and the tail portion has begun to pull up toward the screw head 42, the strips 28 in the shank 24 of the sleeve 12 have begun to fold at the position of the internal notches 30.

Figure 6:
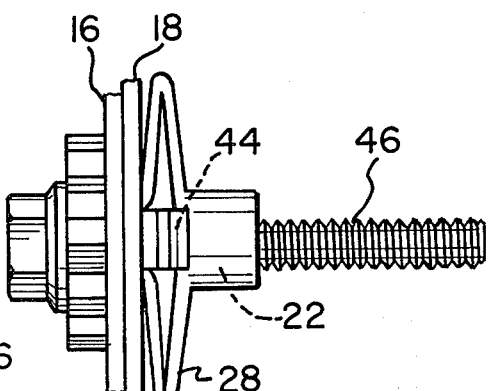
FIG. 6 is an elevation view of the fastener in a fully set condition joining two panels to one another.

Continued torquing of the screw 32 with respect to the tubular sleeve 12 results in the strips 28 being folded even further, as shown in FIG. 6, and the tail portion is pulled closer to the screw head 42. At the point shown in FIG. 6, there are no further screw threads 46 on the screw shank 44 for the threads 22 in the tail portion to engage. Because of the absence of screw threads on the screw shank 44 above this point, the continued torquing of the screw with respect to the sleeve will not pull the tail portion tighter against the work. Thus, overtorquing is prevented by selection of the appropriate length of screw threads 46, fastener length, and length of internal threads 22 in the tubular sleeve 12. In this connection, it is to be noted that the screw shank 44, between the top of the screw threads 46 and the head portion 14 of the sleeve, has a diameter approximately equal to or less than the root diameter of the screw threads 46 and is devoid of threads, and the length of the sleeve 12 between the end opposite the sleeve head 14 and the internal notches 30 is less than the length of the screw shank which carries screw threads 46.

The subject fasteners have been utilized in the installation of side laps of corrugated translucent fiber glass sheets as a cover for a coal conveyor. While this environment is very hostile, the installation has been satisfactory. The installation was made from a single access side and the sheets were clamped together by the fastener in the area of the sheet overlap.

Tension tests were conducted in 26 gauge sheet steel of single thickness. These tests consisted of setting various fasteners and then pulling the fastener until either the fastener and/or the material failed. The subject fastener with a stainless steel screw failed at an applied average load of 250 pounds with both the material and fastener failing. The standard Lap-Lox fastener described hereinbefore failed at an average load of 90 pounds with only the fastener failing. A ¾ inch sheet metal carbon steel cadmium plated screw with a hex head installed in a ⅛ inch hole failed at an average load of 173 pounds with only the material failing. When the subject fastener was installed in thicker material (3/16 inch steel sheet and 5/16 inch hole) the average load increased to 318.5 pounds.

Having described presently preferred embodiments of the invention, it is to be understood that it may be otherwise embodied within the scope of the appended claims.

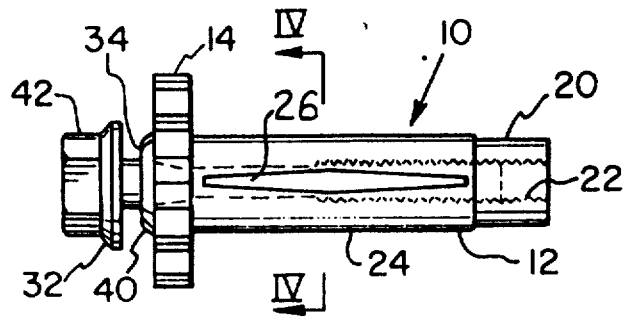

I claim:

1. In a collapsible fastener for joining workpieces wherein a tubular sleeve has a head on one end bearing against one surface of the work, an internally threaded tail and a shank extending between said sleeve ends, the shank of the sleeve including longitudinally extending slots and the resulting strips being notched internally intermediate the ends, and a screw with threads is extended through the head and the sleeve and is threaded into the tail such that by turning the screw, the tail travels toward the head and the strips are folded against the other surface of the work, the improvement comprising:
   A. a compressible annulus on the opposite side of the head of the sleeve from the shank and surrounding the bore of the sleeve, said annulus being radially inwardly tapered through its periphery toward the longitudinal central axis of the tubular sleeve, said tubular sleeve and annulus being one piece;
   B. the screw shank between the top of the screw threads and the head portion having a diameter approximately equal to or less than the root diameter of the screw threads and being devoid of threads; and
   C. the length of the sleeve between the end opposite the sleeve head and the internal notches being less than the length of the screw shank carrying threads
such that the annulus is tightly engaged by the screw against the work to provide a seal therebetween, said screw threads, fastener length and internally threaded tail length being selected so that for a given thickness of workpieces overtorquing of the fastener is prevented by the absence of threads on the screw shank.

2. The improvement as set forth in claim 1 wherein the slots are tapered and increase in width from opposing ends into the area of the notches.

3. The improvement as set forth in claim 1 wherein the sleeve is made of a plastic material.

4. The improvement as set forth in claims 1, 2 or 3 wherein the sleeve is polycarbonate.

* * * * *

UNITED STATES PATENT AND TRADEMARK OFFICE
CERTIFICATE OF CORRECTION

PATENT NO. : 4,416,572

DATED : November 22, 1983

INVENTOR(S) : Daniel A. Black

It is certified that error appears in the above-identified patent and that said Letters Patent is hereby corrected as shown below:

The title page should be deleted to appear as per attached title page.

Column 4, line 35, "reduced" should read -- reducing --.

Signed and Sealed this

Twentieth Day of March 1984

[SEAL]

Attest:

Attesting Officer

GERALD J. MOSSINGHOFF

Commissioner of Patents and Trademarks

United States Patent

Black

[11] 4,416,572
[45] Nov. 22, 1983

[54] COLLAPSIBLE FASTENER WITH PLASTIC SLEEVE

[75] Inventor: Daniel A. Black, Pleasant Hills, Pa.

[73] Assignee: Textron Inc., Providence, R.I.

[21] Appl. No.: 264,436

[22] Filed: May 18, 1981

[51] Int. Cl.³ .................................................. F16B 13/04
[52] U.S. Cl. .................................... 411/38; 411/542; 411/908
[58] Field of Search ............ 411/1, 8, 11, 29, 34–38, 411/70, 542, 907, 908, 15

[56] References Cited

U.S. PATENT DOCUMENTS

| 3,316,796 | 5/1967 | Young | 411/29 |
| 4,274,324 | 6/1981 | Giannuzzi | 411/908 |
| 4,280,390 | 7/1981 | Murray | 411/542 |

FOREIGN PATENT DOCUMENTS 1278641 11/1961 France ............... 411/38

Primary Examiner—Gary L. Smith
Assistant Examiner—Neill Wilson
Attorney, Agent, or Firm—Webb, Burden, Robinson & Webb

[57] ABSTRACT

A collapsible fastener comprises a tubular plastic having a head on one end for bearing against one surface of the work. There is an internally threaded tail portion at the shank end of the sleeve. The shank is slotted to define strips which are notched internally and intermediate the ends. The slots increase in width from their ends to the area of the notches. A screw extends through the sleeve and is devoid of threads intermediate its ends to prevent overtorquing. A radially tapered annulus is positioned atop the sleeve for sealable engagement with the screw head in the assembled condition.

4 Claims, 6 Drawing Figures